(12) United States Patent
Kono et al.

(10) Patent No.: US 9,956,730 B2
(45) Date of Patent: May 1, 2018

(54) COMPRESSOR SYSTEM, AND PUNCTURE REPAIR KIT USING SAME

(71) Applicants: SUMITOMO RUBBER INDUSTRIES, LTD., Kobe-shi, Hyogo (JP); UNIK WORLD IND. CO., LTD., Tainan (TW)

(72) Inventors: Tsutomu Kono, Kobe (JP); Yoshihide Kojima, Kobe (JP); Vincent Chou, Tainan (TW)

(73) Assignees: SUMITOMO RUBBER INDUSTRIES, LTD., Kobe-Shi, Hyogo (JP); UNIK WORLD IND. CO., LTD., Tainan (TW)

( * ) Notice: Subject to any disclaimer, the term of this patent is extended or adjusted under 35 U.S.C. 154(b) by 449 days.

(21) Appl. No.: 14/433,435

(22) PCT Filed: Oct. 18, 2013

(86) PCT No.: PCT/JP2013/078299
§ 371 (c)(1),
(2) Date: Apr. 3, 2015

(87) PCT Pub. No.: WO2014/065208
PCT Pub. Date: May 1, 2014

(65) Prior Publication Data
US 2015/0246490 A1    Sep. 3, 2015

(30) Foreign Application Priority Data

Oct. 26, 2012  (JP) ................................. 2012-237051
Oct. 26, 2012  (JP) ................................. 2012-237052

(51) Int. Cl.
*F04B 35/04*    (2006.01)
*F04B 35/06*    (2006.01)
(Continued)

(52) U.S. Cl.
CPC .......... *B29C 73/166* (2013.01); *B29C 73/025* (2013.01); *F04B 11/0008* (2013.01);
(Continued)

(58) Field of Classification Search
CPC ...... F04B 35/04; F04B 35/06; F04B 39/0016; B29C 70/166; B29C 70/025; B29C 73/166; B29C 73/025; B29L 2030/00
See application file for complete search history.

(56) References Cited

U.S. PATENT DOCUMENTS 7,547,201 B2 *  6/2009  Chou .................... B29C 73/166
                                                         277/438
8,562,306 B2 * 10/2013  Kojima .................. F04B 35/06
                                                         137/551
(Continued)

FOREIGN PATENT DOCUMENTS

JP       61-192877 A      8/1986
JP       2002-61578 A     2/2002
(Continued)

OTHER PUBLICATIONS

International Search Report, issued in PCT/JP2013/078299, dated Jan. 7, 2014.

*Primary Examiner* — Peter J Bertheaud
(74) *Attorney, Agent, or Firm* — Birch, Stewart, Kolasch & Birch, LLP

(57) ABSTRACT

The pressure of compressed air supplied to an object to be filled with air is controlled at a specified pressure or less without using a relief valve. Given that a cylinder volume (stroke volume) during a piston moves from the lower dead point to the top dead point is V1, a cylinder volume (compression volume) when the piston reaches the top dead point is V2, the atmospheric pressure is $P_0$, and the specified pressure is $P_P$, the compression volume V2 in the compres- (Continued)

sor system satisfies the following expression (1). The diameter D of the air intake hole of an air intake valve provided on the piston is 3 to 15 mm.

$$0.8 \times \{V1 \times P_0/(P_P-P_0)\} = <V2 < 1.0 \times \{V1 \times P_0/(P_P-P_0)\} \quad (1)$$

8 Claims, 10 Drawing Sheets

(51) Int. Cl.
 F04B 39/00 (2006.01)
 B29C 73/16 (2006.01)
 F04B 11/00 (2006.01)
 F04B 41/02 (2006.01)
 B29C 73/02 (2006.01)
 F04B 35/01 (2006.01)
 F04B 39/10 (2006.01)
 F04B 39/12 (2006.01)
 B29L 30/00 (2006.01)

(52) U.S. Cl.
 CPC ............ *F04B 35/01* (2013.01); *F04B 35/06* (2013.01); *F04B 39/0016* (2013.01); *F04B 39/0094* (2013.01); *F04B 39/10* (2013.01); *F04B 39/121* (2013.01); *F04B 41/02* (2013.01); *B29L 2030/00* (2013.01); *F04B 35/04* (2013.01); *Y10T 137/3115* (2015.04)

(56) References Cited

U.S. PATENT DOCUMENTS

| | | | |
|---|---|---|---|
| 8,997,801 B2 * | 4/2015 | Kojima | B29C 73/166 |
| | | | 141/38 |
| 2007/0077157 A1 * | 4/2007 | Chou | F04B 35/01 |
| | | | 417/437 |
| 2010/0267298 A1 | 10/2010 | Tawa et al. | |
| 2011/0038738 A1 * | 2/2011 | Kojima | F04B 35/06 |
| | | | 417/63 |

FOREIGN PATENT DOCUMENTS

| | | | |
|---|---|---|---|
| JP | 2004-190625 A | | 7/2004 |
| JP | 2010-89273 A | | 4/2010 |
| JP | 2011-126185 A | | 6/2010 |
| JP | 2010-162847 A | | 7/2010 |
| JP | 2010-164033 A | | 7/2010 |
| JP | 2010-249010 A | | 11/2010 |
| JP | 2012-101450 A | | 5/2012 |
| JP | 2012-157974 A | | 8/2012 |
| WO | WO2011055632 | * | 5/2011 |

* cited by examiner

FIG.9
(A)
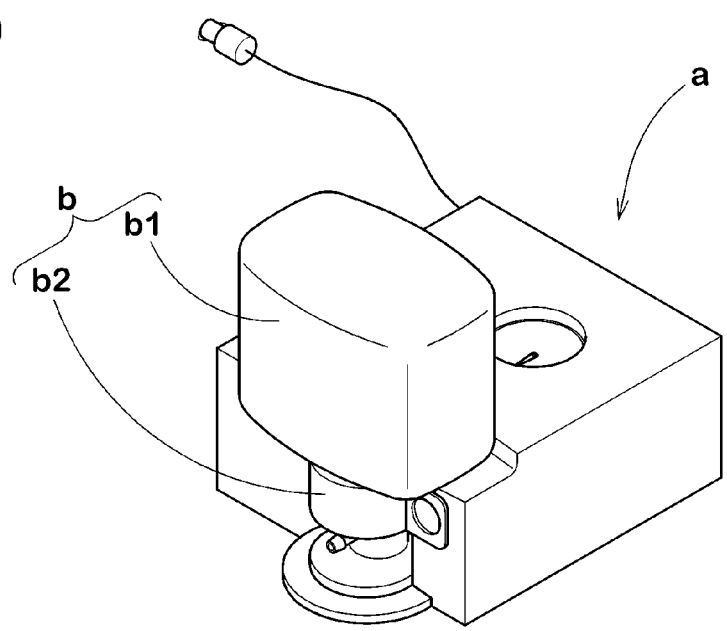
(B)
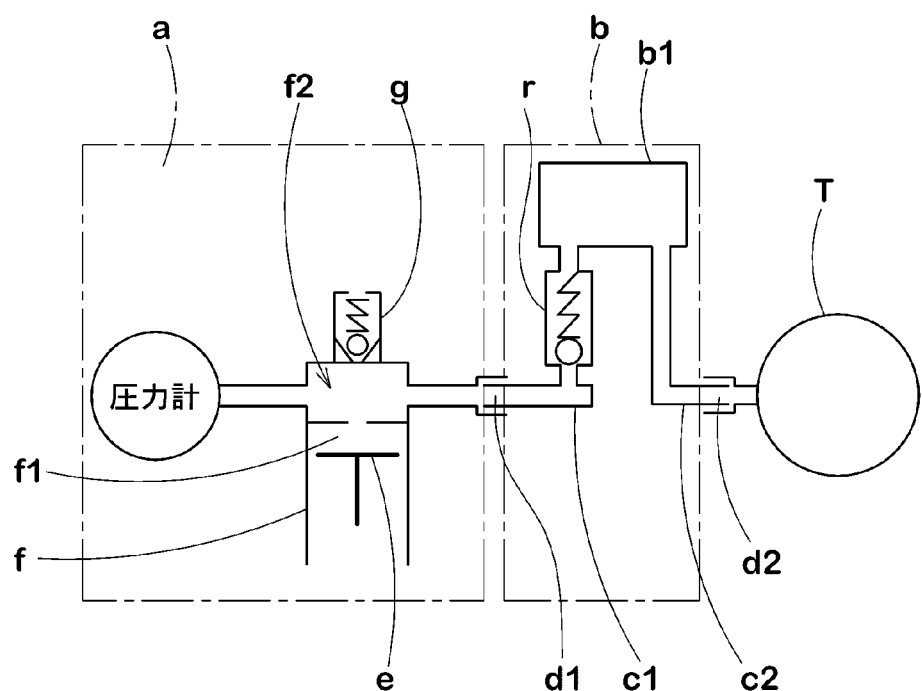

COMPRESSOR SYSTEM, AND PUNCTURE REPAIR KIT USING SAME

TECHNICAL FIELD

The present invention relates to a compressor system capable of controlling the pressure of compressed air supplied to an object to be filled with air, at a specified pressure or lower without using a relief valve, and a puncture repair kit using the same.

BACKGROUND ART

As a puncture repair kit for emergency repairing a puncture, that shown in FIG. 9(A) has been proposed (see for example, patent document 1). This puncture repair kit is composed of a compressor system (a) for producing compressed air, and a bottle unit b in which a cap b2 is attached to a mouth portion of a reservoir bottle b1 containing a puncture sealant.

As shown in FIG. 9(B) conceptually, the cap b2 is provided with an air intake port portion d1 for feeding the compressed air from the compressor system (a) into the reservoir bottle b1 through a first flow passage c1, and an output port portion d2 for sequentially taking out the puncture sealant and compressed air from the reservoir bottle b1, by the feeding of the compressed air, toward the tire T through a second flow passage c2.

The compressor system (a) has a cylinder f in which a piston e is reciprocably disposed. The cylinder f is provided therein with a pump chamber f1 in which air is compressed between the piston e and itself, and a surge chamber f2 for receiving the compressed air compressed in the pump chamber f1 through an air release valve (not shown).

To the surge chamber f2, a relief valve g is connected in order to release excessive pressure if the supply pressure of the compressed air increased over the specified pressure.

In general, the specified pressure is set at the permissible maximum pressure of the tire in order to prevent the tire from being damaged by inflating over the specified pressure.

On the other hand, as shown in FIG. 10, the relief valve g has a tubular valve casing i of which anterior end portion is attached to the surge chamber f2 of the cylinder f.

The valve casing i is provided with a central hole h of which anterior end forms an air intake port h1 (see for example patent document 2). In the central hole h, there are disposed
a valving element k for opening and closing the air intake port h1, and a coiled spring n biasing the valving element k toward the air intake port h1.

An adjusting cap j having an exhaust hole j1 is threadedly engaged with the posterior end of the central hole h so as to move back and forth freely.
When the relief valve g is assembled, the biasing force of the coiled spring n is adjusted by rotating the adjusting cap j to move back and forth so that the relief valve g opens at the specified pressure (relief valve set pressure).

As explained above, a relief valve g has a large number of components, and the adjusting operation is required for every relief valve when assembled. Therefore, the production requires much time and labor which is one factor of a decrease in the productivity and an increase in the production cost of the compressor system.

During the puncture sealant is injected into the tire T by the use of the compressor system (a), if an abnormal operating condition such that a tire valve part becomes clogged occurs, the pressure in the reservoir bottle b1 is gradually increased, and if over the specified pressure (relief valve set pressure), the relief valve g opens to release excessive pressure. However, this has a problem such that, since the pressure is dropped when the compressed air is discharged from the relief valve g, the puncture sealant in the reservoir bottle b1 flows reversely toward the surge chamber f2 and runs out from the relief valve g together with the air having the excessive pressure.

In particular, in a puncture repair kit in which a compressor system (a) is directly connected to a compressor system (a), the flow passage from a reservoir bottle b1 to a surge chamber f2 is short, therefore, the problem of the reverse flow becomes larger. Therefore, as disclosed in the patent document 1, an one-way valve r for preventing a reverse flow is conventionally disposed in the first flow passage c1.

However, similarly to the relief valve g, the one-way valve r has a large number of components. This becomes a factor of an increase in the production cost.

PRIOR ART DOCUMENT

Patent Document

Patent document 1: JP-A-2010-249010
Patent document 2: JP-A-2012-101450

SUMMARY OF THE INVENTION

Problems to be Solved by the Invention

A first object of the present invention is to provide a compressor system, which can control the pressure of compressed air supplied to an object to be filled with air, at a specified pressure or lower although a relief valve is eliminated, and which can achieve an improvement in the productivity and a cost-cutting while assuring safety by preventing damage of the object to be filled with air due to overpressure.

A second object of the present invention is to provide a puncture repair kit, in which the reverse flow of the puncture sealant toward the compressor system is prevented and a one-way valve can be eliminated, and which can further achieve the improvement in the productivity and the cost-cutting in addition to the above-mentioned merits.

Means of Solving the Problems

A first invention in the present application is a compressor system, in which a supply pressure of compressed air is controlled at a specified pressure $P_P$ or less without using a relief valve, and which is characterized by having
 a motor,
 a piston driven by the motor through a crank mechanism,
 a cylinder having
a cylinder main body forming a pump chamber housing the piston reciprocably from a lower dead point to a top dead point and compressing air between the piston and itself, and
a cylinder subpart forming a surge chamber for receiving the compressed air compressed in the pump chamber through an air release valve,
 an air intake valve having an air intake hole penetrating through the piston to take outside air into the pump chamber, and a valving element formed from a leaf spring closing a pump chamber side of the air intake hole with its elasticity, and an air supplying passage for sending and supplying the compressed air from the surge chamber toward outside, wherein the compression volume V2 satisfies the following expression (1), and the diameter D of the air intake hole is 3 to 15 mm, $$0.8\times\{V1\times P_0/(P_P-P_0)\}=<V2<1.0\times\{V1\times P_0/(P_P-P_0)\} \quad (1)$$

wherein

V1 is a stroke volume which is a cylinder volume during the piston moves from the lower dead point to the top dead point, V2 is a compression volume which is a cylinder volume when the piston is at the top dead point, and $P_0$ is an atmospheric pressure.

A second invention in the present application is a puncture repair kit, which has the compressor system in the first invention, and a bottle unit in which a cap is attached to a mouth portion of a reservoir bottle containing a puncture sealant, and which is characterized in that the cap has an air intake port portion for feeding the compressed air from the compressor system into the reservoir bottle through a first flow passage, and an output port portion for sequentially taking out the puncture sealant and the compressed air from the reservoir bottle through a second flow passage upon feeding of the compressed air, and the first flow passage is not provided with a one-way valve for preventing the puncture sealant from flowing reversely toward the compressor system.

By the way, the above-mentioned pressure $P_P$, $P_0$ is an absolute pressure.

Effects of the Invention

In the first and second inventions, the compression volume V2 of the cylinder of the compressor system satisfies the expression (1).

According to Boyle's law, a product $\{P_0\times(V1+V2)\}$ of the pressure and volume of the air in the cylinder under such a state that air is sucked in the cylinder at the lower dead point becomes equal to a product (Pmax×V2) of the pressure and volume of the air in the cylinder under such a state that the air is compressed to the maximum pressure Pmax at the top dead point. Therefore, the following expression (A) is obtained. From this expression (A), the compression volume V2 is given by the expression (B).

$$P\mathrm{max}\times V2 = P_0\times(V1+V2) \quad (A)$$

$$V2=(P_0\times V1)/(P\mathrm{max}-P_0) \quad (B)$$

On the other hand, when the air pressure in the surge chamber is gradually increased and becomes equal to the maximum pressure Pmax, the pressure on the inside of the air release valve becomes equal to that on the outside thereof. Therefore, the compressed air in the cylinder becomes not discharged toward the surge chamber and remains in the cylinder. In other words, although the piston is operated, the intake of air into the cylinder and the discharge of air from the cylinder are not took place. The supply pressure of the compressor system is prevented from increasing over the maximum pressure Pmax in the cylinder.

Accordingly, by setting the specified pressure $P_P$ of the compressor system at the maximum pressure Pmax, the supply pressure of the compressor system can be controlled at the specified pressure $P_P$ or less without using a relief valve.

The compression volume V2 for that purpose can be given by the following expression (C).

$$V2=(P_0\times V1)/(P_P-P_0) \quad (C)$$

In practice, however, affected by the air intake valve, there is a tendency that the volume of the sucked air at the lower dead point becomes less. Accordingly, the compression volume V2 in actuality needs to be set at a value less than $(P_0\times V1)/(P_P-P_0)$.

However, if the compression volume V2 is too small, another problem arises such that the opening and closing of the air intake valve are delayed, and the exhaust efficiency is lowered. In the present invention, therefore, by limiting the diameter of the air intake hole to reduce the intake resistance due to the air intake valve as far as possible, the compression volume V2 not less than 0.8 times the $(P_0\times V1)/(P_P-P_0)$ is secured, and thereby the lowering of the exhaust efficiency is prevented.

A relief valve is eliminated. Accordingly, in the puncture repair kit employing the compressor system, even under abnormal operating condition such that a tire valve part is clogged during repairing the puncture, the pressure in the reservoir bottle is the same as the pressure in the surge chamber and, they are equal to the specified pressure. Accordingly, the reverse flow of the puncture sealant toward the surge chamber is not occurred. Thus, a one-way valve can be eliminated from the first flow passage.

BRIEF EXPLANATION OF THE DRAWINGS

FIG. 9(A) is a perspective view showing a conventional puncture repair kit. (B) is a conceptual diagram showing the internal structure thereof.

MODE FOR CARRYING OUT THE INVENTION

Embodiments of the present invention will now be described in detail.

Figure 1:
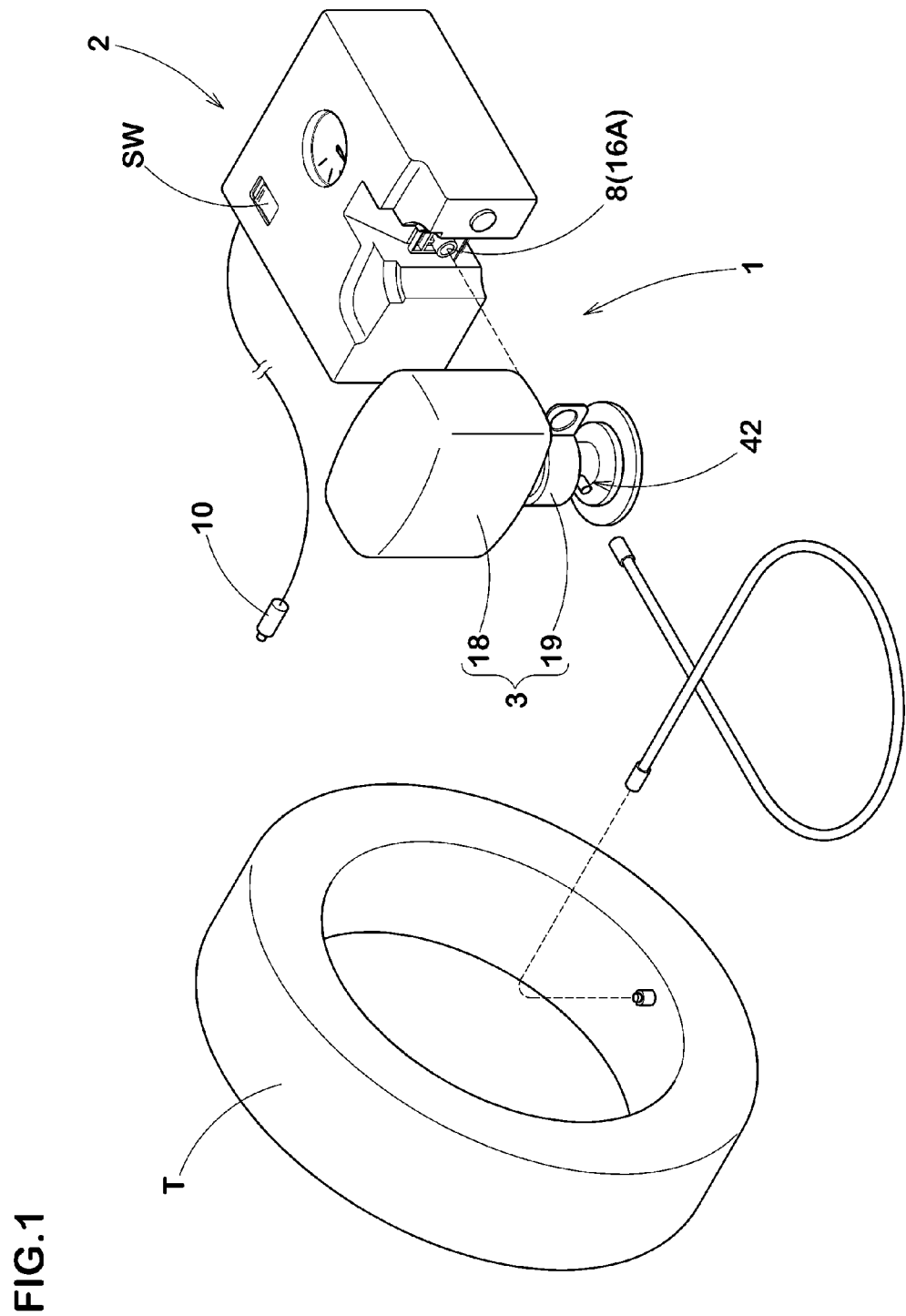
FIG. 1 A perspective view showing an example of usage states of a puncture repair kit of the present invention.

As shown in FIG. 1, a puncture repair kit1 in this embodiment has a compressor system 2 in which the supply pressure of compressed air is controlled at a specified pressure $P_P$ or less without using a relief valve, and a bottle unit 3 operated by the compressed air from the compressor system 2.

Figure 2:
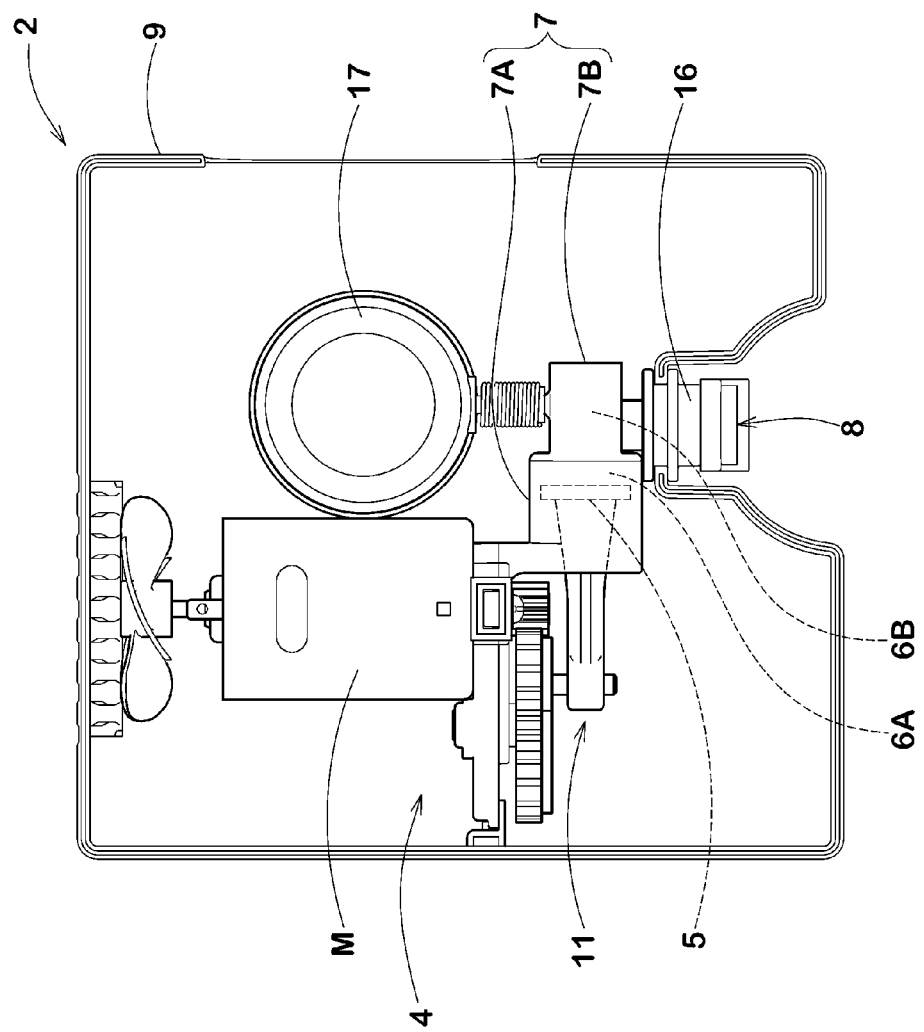
FIG. 2 A plan view showing an internal structure of the compressor system.

In the compressor system 2, as shown in FIG. 2, a compressor main portion 4 to produce compressed air is put in a storage case 9 as one to be portable.

Figure 3:
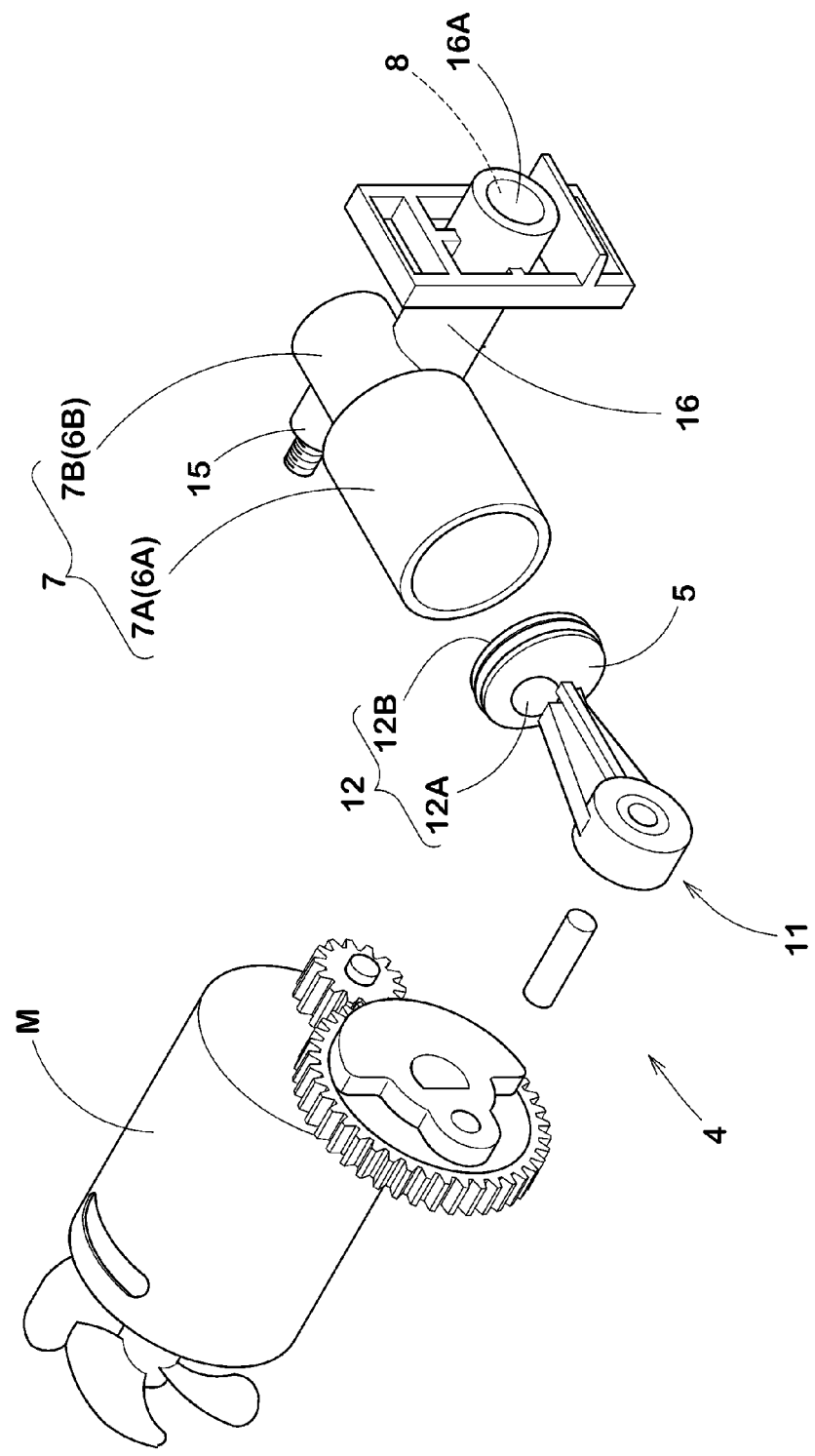
FIG. 3 An exploded perspective view showing an essential part of the compressor main unite.
Figure 4:
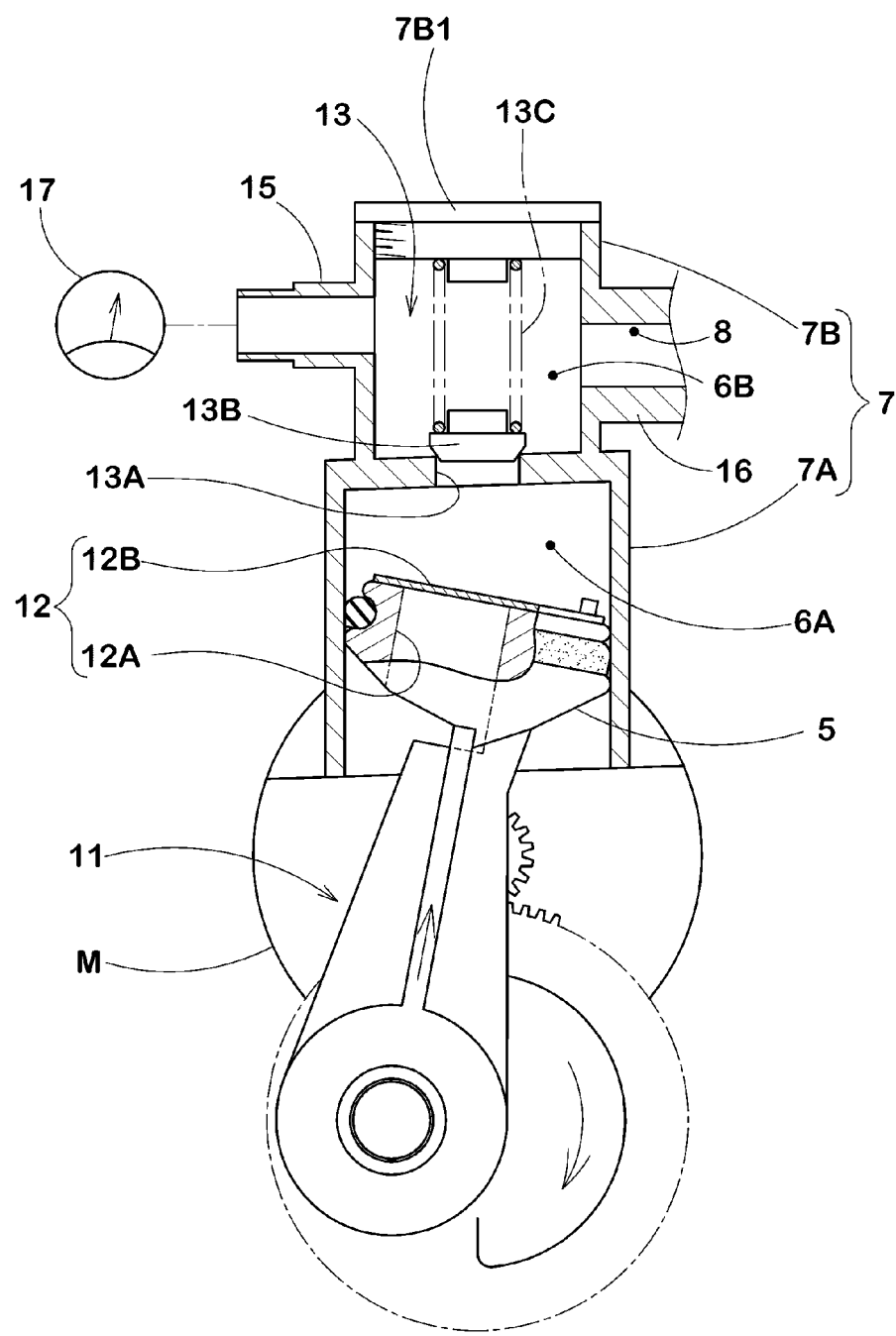
FIG. 4 A cross sectional view showing the essential part of the compressor main unite.

The compressor main portion 4 has at least a motor M, a piston 5, a cylinder 7, an air intake valve 12 (shown in FIGS. 3 to 5), and an air supplying passage 8 (shown in FIGS. 3, 4).

The piston 5 is connected to the motor M through a crank mechanism 11.

The cylinder 7 houses the piston 5 reciprocably.

The air intake valve 12 is attached to the piston 5.

The air supplying passage 8 sends and supplies the produced compressed air toward the bottle unit 3.

The storage case 9 in this example is formed as a flat box with a small height in the form of a substantially rectangular parallelepiped, which can be disassembled into upper and lower casing parts.

As the motor M, commercially-supplied various DC motors operable with a 12 volt direct-current power supply of an automobile can be employed.

A power cord, which is provided at one end with a power plug 10 connectable with a cigarette lighter socket in an automobile, is connected to the motor M through a power on/off switch SW attached to an upper plate part of the storage case 9.

As to the crank mechanism 11, those having various known structures are usable.

The cylinder 7 has a cylinder main body 7A and a cylinder subpart 7B as shown in FIGS. 3 and 4.

The cylinder main body 7A houses the piston 5 reciprocably from the lower dead point PL (shown in FIG. 6) to the top dead point PU, and forms a pump chamber 6A for compressing air between the piston 5 and itself.

The cylinder subpart 7B is connected to the cylinder main body 7A and forms a surge chamber 6B for receiving the compressed air compressed in the pump chamber 6A through an air release valve 13.

The surge chamber 6B dampens pulsation of the compressed air from the pump chamber 6A to stabilize the pressure.

The cylinder subpart 7B is provided with coupling portions 15 and 16.

A pressure indicator 17 for measuring the pressure in the surge chamber 6B is connected to one coupling portion 15.

The coupling portion 16 is provided with the air supplying passage 8.

In this example, the bottle unit 3 is connected to the end of the coupling portion 16 directly without using a hose.

The air release valve 13 is composed of a through hole 13A, a valving element 13B for example made of a rubber member, and a spring means 13c in the form of a coiled spring.

The through hole 13A communicates between the pump chamber 6A and the surge chamber 6B.

The valving element 13B opens and closes a surge chamber 6B side of the through hole 13A.

The spring means 13c is disposed between the valving element 13B and a lid part 7B1 of the cylinder subpart 7B to bias the valving element 13B toward the through hole 13A.

By pressurizing the pump chamber 6A, the air release valve 13 is operated to close the through hole 13A.

The operating force at this time is preferably set to be as small as possible, for example, not more than 80 kPa, more preferably not more than 50 kPa when it is converted into the pressure on the valving element 13B.

Figure 5:
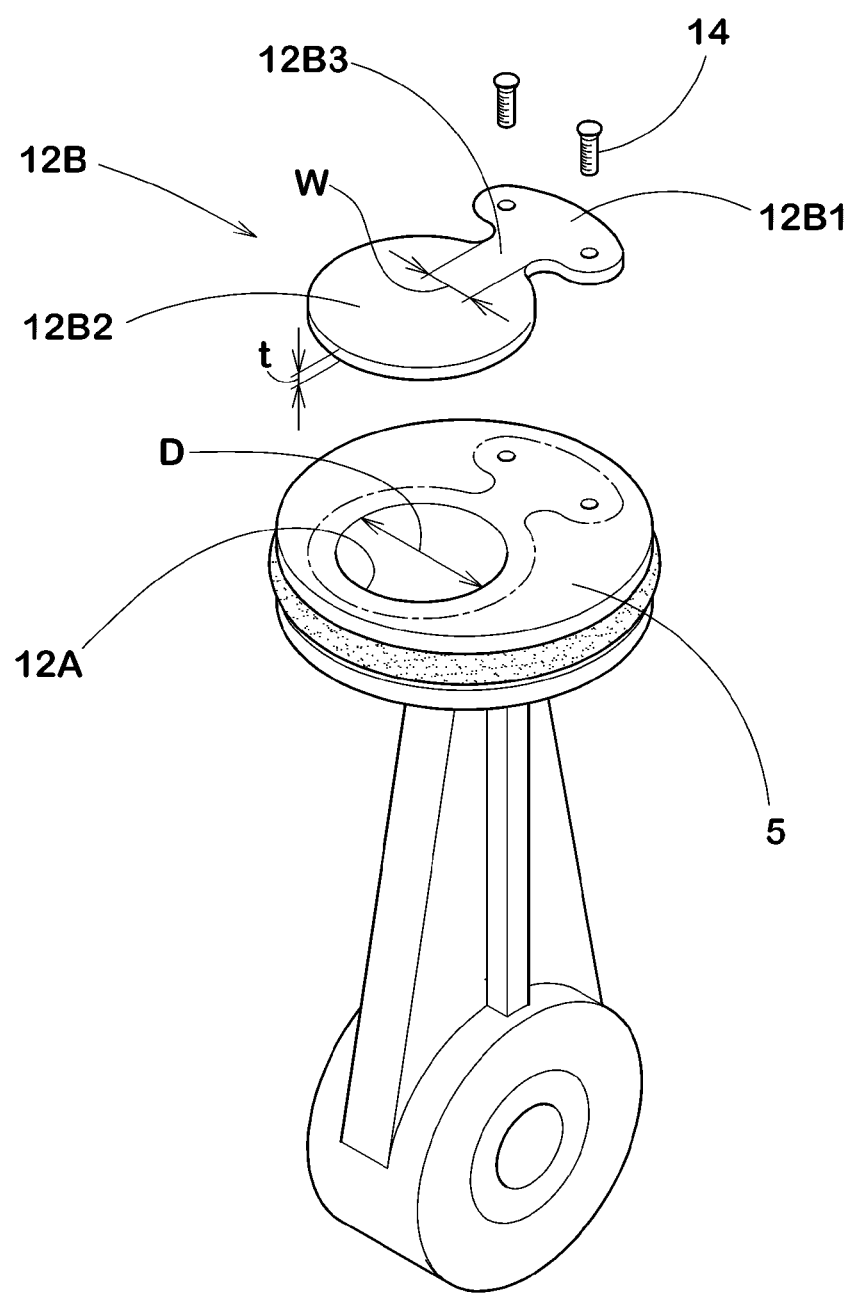
FIG. 5 An exploded perspective view showing the air intake valve.

The air intake valve 12 has an air intake hole 12A penetrating through the piston 5 to take outside air into the pump chamber 6A, and a valving element 12B closing a pump chamber 6A side of the air intake hole 12A with its elasticity. In particular, the valving element 12B is a metal leaf spring as shown in FIG. 5. The valving element 12B in this example has a nearly gourd shape made up of a fixed part 12B1 fixed to the upper surface of the piston 5 for example by the use of screw metal fittings 14 or the like, a covering part 12B2 being substantially disk-shaped and covering the air intake hole 12A, and a constricted part 12B3 disposed therebetween.

By the constricted part 12B3, elasticity deformation is facilitated.

When moving downward from the top dead point PU, owing to a negative pressure in the pump chamber 6A, the air intake hole 12A is opened, and outside air is sucked into the pump chamber 6A.

When moving upward from the lower dead point PL, owing to the elasticity of the valving element 12B and the pressurization of the inside of the pump chamber 6A, the air intake hole 12A can be closed.

In the present invention, in order to control the supply pressure of the compressed air from the compressor system 2 at the specified pressure $P_P$ or less without using a relief valve, the compression volume V2 of the cylinder 7 is set to be more than a conventional volume and within a range expressed by the following expression (1).

Figure 6:
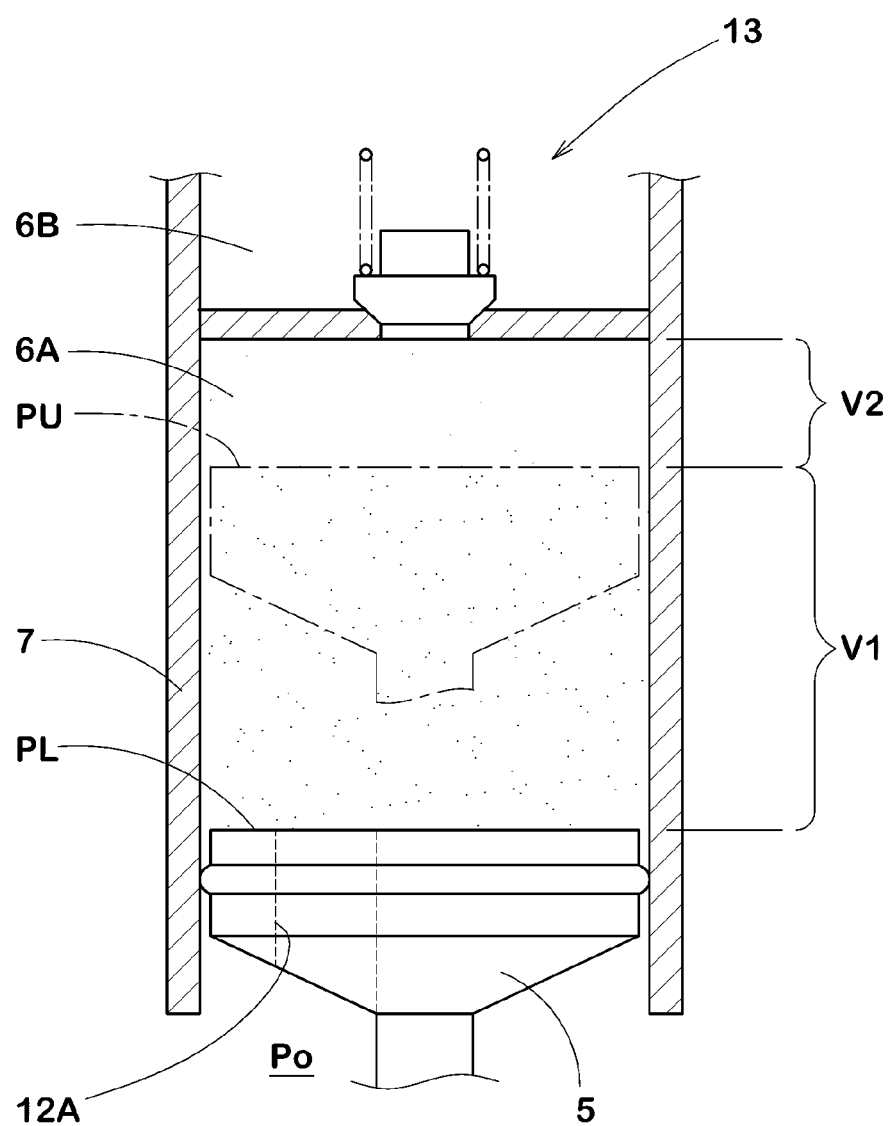
FIG. 6 A schematic cross sectional view for explaining the stroke volume V1 and the compression volume V2.

Given that, as shown in FIG. 6,

V1 is a stroke volume which is a cylinder volume during the piston 5 moves from the lower dead point PL to the top dead point PU, V2 is a compression volume which is a cylinder volume when the piston 5 reaches the top dead point PU, and $P_0$ is the atmospheric pressure, the compression volume V2 is set within a range satisfying the following expression (1)

$$0.8 \times \{V1 \times P_0/(P_P - P_0)\} = < V2 < 1.0 \times \{V1 \times P_0/(P_P - P_0)\} \quad (1).$$

According to Boyle's law, a product $\{P_0 \times (V1+V2)\}$ of the pressure and volume of the air in the cylinder 7 under such a state that air is sucked in the cylinder 7 at the lower dead point PL becomes equal to a product (Pmax×V2) of the pressure and volume of the air in the cylinder 7 under such a state that the air is compressed to the maximum pressure Pmax at the top dead point PU. Therefore, the following expression (A) is obtained. From this expression (A), the compression volume V2 is given by the expression (B).

$$P\text{max} \times V2 = P_0 \times (V1 + V2) \quad (A)$$

$$V2 = (P_0 \times V1)/(P\text{max} - P_0) \quad (B)$$

On the other hand, when the air pressure in the surge chamber 6B is gradually increased and becomes equal to the maximum pressure Pmax, the pressure on the inside of the air release valve 13 becomes equal to that on the outside thereof. Therefore, the compressed air in the cylinder 7 becomes not discharged toward the surge chamber 6B and remains in the cylinder 7. In other words, although the piston 5 is operated, the intake of air into the cylinder 7 and the discharge of air from the cylinder are not took place. The supply pressure of the compressor system 2 is prevented from increasing over the maximum pressure Pmax.

Accordingly, by setting the specified pressure $P_P$ of the compressor system 2 at the maximum pressure Pmax, the supply pressure of the compressor system 2 can be controlled at the specified pressure $P_P$ or less without using a relief valve. The compression volume V2 for that purpose can be given by the following expression (C) theoretically $$V2=(P_0 \times V1)/(P_P-P_0) \qquad (C).$$

In the case of the compressor system for repairing puncture of a tire or for pumping up a tire, it is preferable to use, as the specified pressure $P_P$, the permissible maximum pressure for the tire, for example,
451.3 kPa (if converted to a gauge pressure, 350 kPa) in the case of a passenger car tire,
701.3 kPa (if converted to a gauge pressure, 600 kPa) in the case of a light truck tire,
901.3 kPa (if converted to a gauge pressure, 800 kPa) in the case of a heavy duty tire.

In practice, however, affected by the air intake valve 12, there is a tendency that the volume of the sucked air at the lower dead point P1 becomes less. Accordingly, the compression volume V2 in actuality needs to be set at a value less than $(P_0 \times V1)/(P_P-P_0)$.

However, if the compression volume V2 is too small, another problem arises such that the opening and closing of the air intake valve 12 are delayed, and the exhaust efficiency is remarkably lowered.

In the present invention, therefore, by limiting the diameter D (shown in FIG. 5) of the air intake hole 12A to reduce the intake resistance due to the air intake valve 12, the compression volume V2 not less than 0.8 times $(P_0 \times V1)/(P_P-P_0)$ is secured, and thereby the lowering of the exhaust efficiency is prevented.

More specifically, the diameter D of the air intake hole 12A is limited in the range of 3 to 15 mm.

If the diameter D becomes less than 3 mm, the intake volume becomes insufficient, causing a decrease in the exhaust efficiency of the compressor.

If the diameter D becomes more than 15 mm, since the valving element 12B is made form a thin leaf spring, the tight sealing of the air intake hole 12A is impaired, causing a decrease in the exhaust efficiency.

Therefore, it is preferable that the lower limit of the diameter D is not less than 5 mm, and the upper limit is not more than 10 mm.

In this case, it is preferable that the thickness t (shown in FIG. 5) of the valving element 12B is 0.05 to 0.2 mm. If more than 0.2 mm, although the inertia resistance during the piston is moving becomes large, the bending rigidity of the valving element 12B becomes excessively high, and the air intake hole 12A becomes not opened sufficiently, which causes a shortage of the intake volume.

If the thickness t is less than 0.05 mm, the rigidity of the valving element 12B becomes insufficient, and the tight sealing of the air intake hole 12A is impaired, which causes a decrease in the exhaust efficiency.

Based on these standpoints, the lower limit of the thickness t is more preferably not less than 0.07 mm, and the upper limit is more preferably not more than 0.15 mm. From the same standpoints, it is preferable that the width W (shown in FIG. 5) of the constricted part 12B3 is set to be not more than 10 mm to prevent the insufficiency of the intake volume.

For the valving element 12B, a stainless material especially superior in the corrosion resistance can be suitably used.

It is preferable that the covering part 12B2 is formed to have a diameter 1 to 5 mm larger than the diameter D of the air intake hole 12A.

The bottle unit 3 is as shown in FIG. 1, composed of a reservoir bottle 18 containing a puncture sealant, and a cap 19 attached to a mouth portion thereof.

Figure 7:
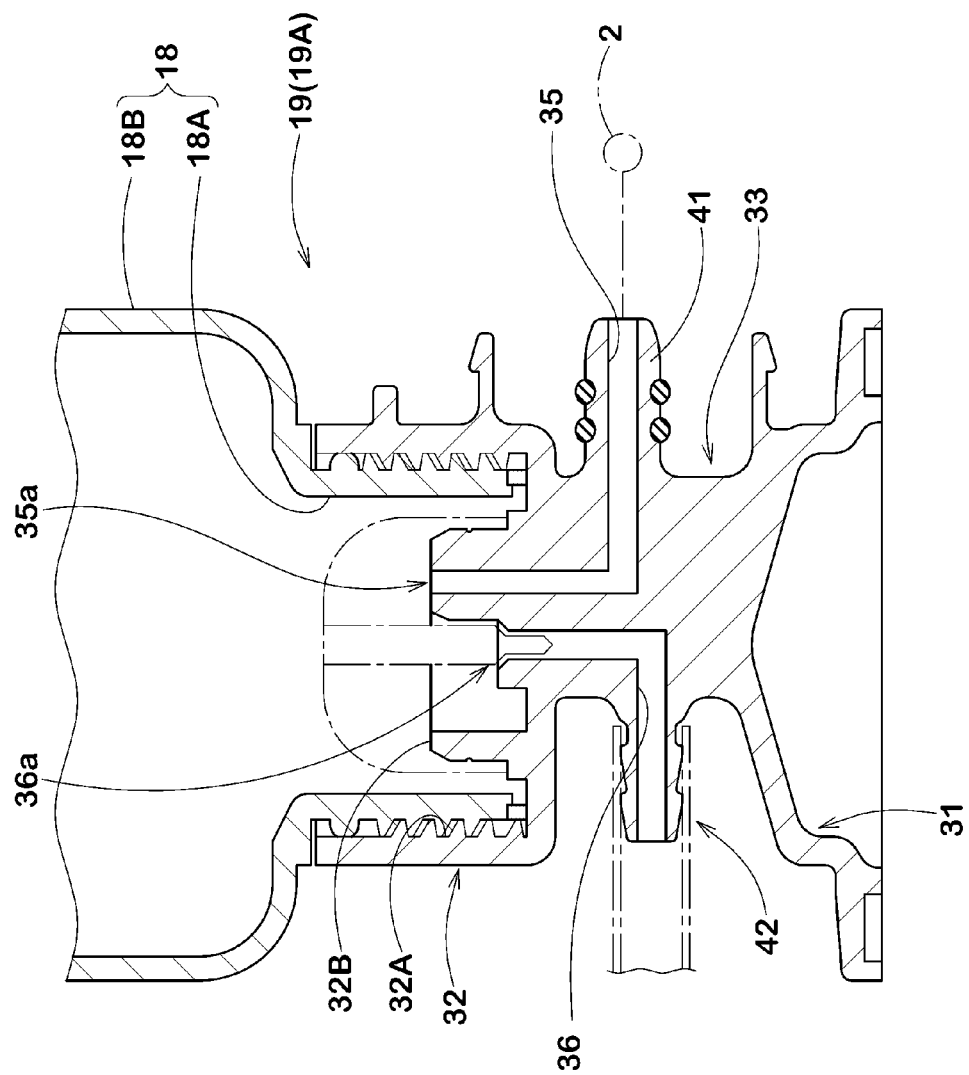
FIG. 7 A cross sectional view showing the cap together with the reservoir bottle.

In the reservoir bottle 18, as shown in FIG. 7, the small-diameter cylindrical mouth portion 18A, through which the puncture sealant can be took out and injected, is protrudingly provided at the lower end of its body 18B.

The cap 19 has an intake port portion 41 capable of directly connecting to an outlet mouth portion 16A at the end of the coupling portion 16 of the compressor system 2 so as to feed the compressed air from the outlet mouth portion 16A into the reservoir bottle 18, and
an output port portion 42 for sequentially taking out the puncture sealant and compressed air from the reservoir bottle 18 upon feeding the compressed air.

In particular, the cap 19 has a cap main portion 19A which integrally has a bottom plate part 31 defining a bottom face, a bottle mounting part 32 on which the mouth portion 18A of the reservoir bottle 18 is mounted, and a constricted part 33 disposed therebetween.

In the cap main portion 19A, there are formed
a first flow passage 35 extending from the intake port portion 41 into the mouth portion 18A of the reservoir bottle 18, and
a second flow passage 36 extending from the output port portion 42 into the mouth portion 18A of the reservoir bottle 18.

The bottle mounting part 32 has a reentrant mounting portion 32A to which the mouth portion 18A is fixed, and a boss portion 32B protruding from the bottom face of the reentrant mounting portion 32A.

The reentrant mounting portion 32A can be fixed to the mouth portion 18A by screwing an inside screw formed on the inside wall surface.

In the upper surface of the boss portion 32B, opened are a first flow passage upper opening 35a defining the upper end of the first flow passage 35, and
a second flow passage upper opening 36a defining the upper end of the second flow passage 36.

The intake port portion 41 in this example is a connection nozzle protruding from the constricted part 33 toward the outlet mouth portion 16A.

Figure 8:
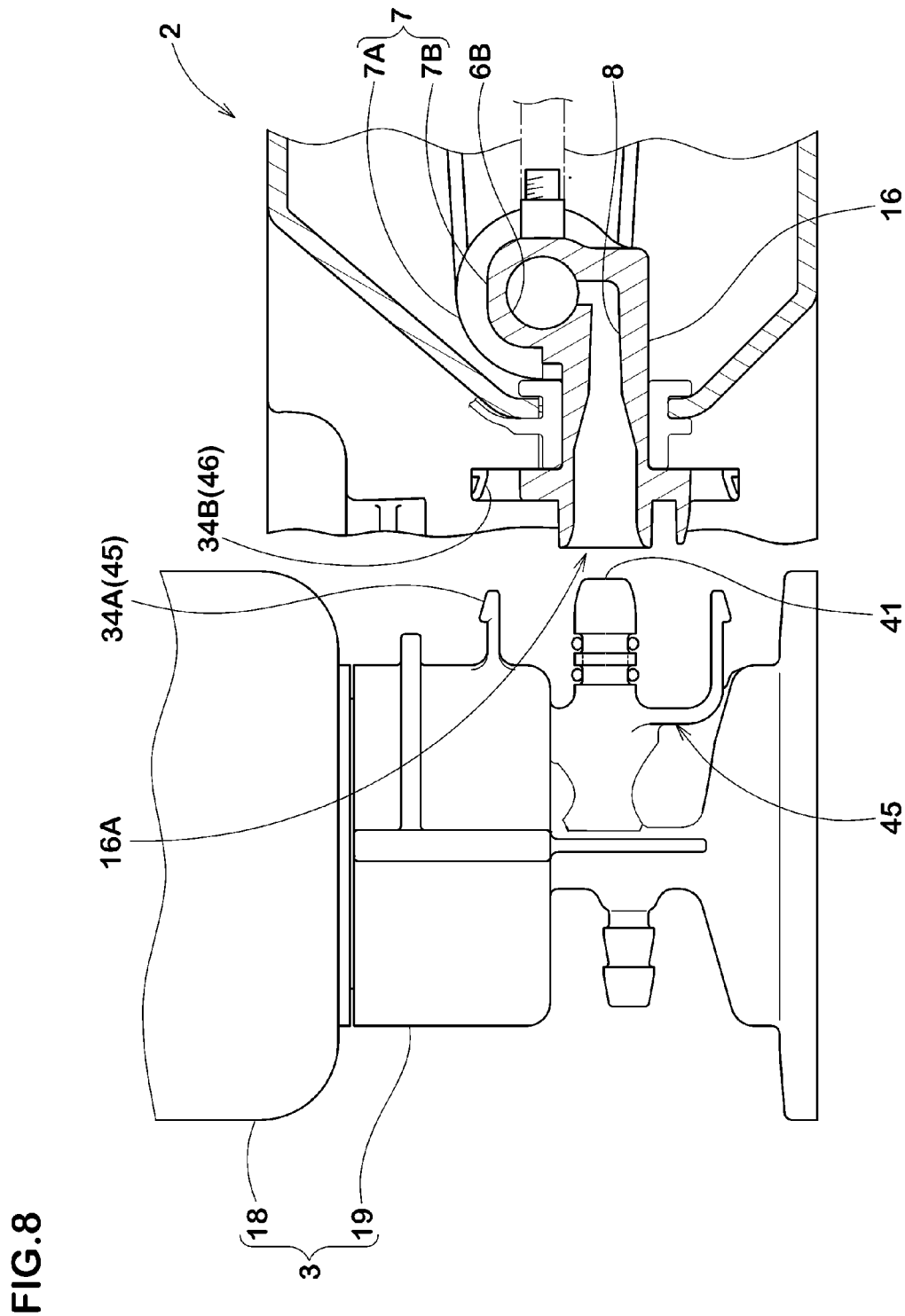
FIG. 8 A cross sectional partial view showing a connection state of the compressor system and the bottle unit.
Figure 10:
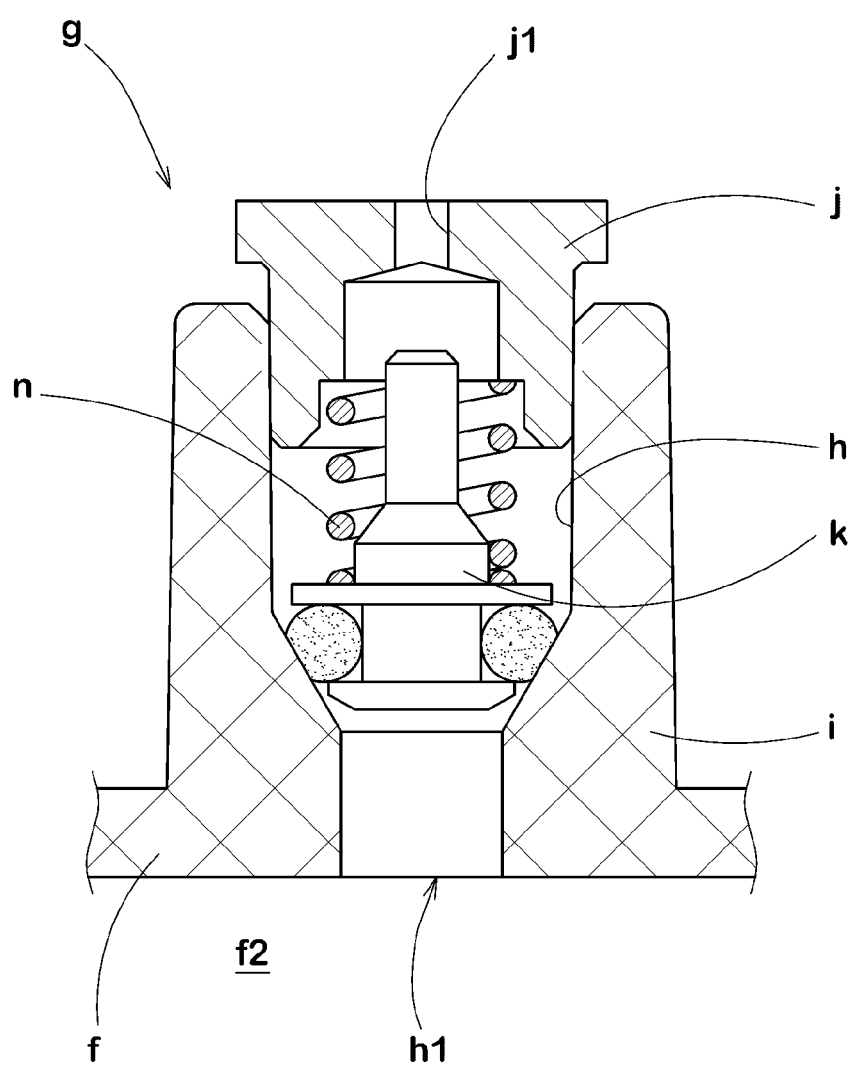
FIG. 10 A cross sectional view showing a relief valve used in a compressor system.

As shown in FIG. 8, the connection nozzle (intake port portion 41) is fitted in the outlet mouth portion 16A and directly connected without using a hose.

Such a construction that the coupling portion 16 is connected to the intake port portion 41 through a hose may be also possible.

The puncture repair kit1 in this example is provided with a lock mechanism 34 in order to prevent a surrounding area from being tainted with the puncture sealant as a result of disconnection of the outlet mouth portion 16A from the intake port portion 41 during repairing puncture.

The lock mechanism 34 is composed of a engaging means 34A formed on the cap 19, and a fall-out prevention means 34B formed on the compressor system 2.

In this example, the engaging means 34A is composed of a pair of engaging claws 45 which protrude toward the compressor system 2 on both sides (in this example, upper side and under side) of the intake port portion 41, and which are each provided at the tip with a hook portion in the form of a right-angled triangle. In this example, the fall-out prevention means 34B has claw engaging holes 46 which are disposed at positions opposite to the engaging claws 45, and which can engage with the engaging claws 45 to prevent from falling out.

In the puncture repair kit 1 like this, the compressor system 2 has no relief valve. Therefore, even under abnormal operating condition such that a tire valve part is clogged during injecting the puncture sealant, the pressure in the reservoir bottle 18 and the pressure in the surge chamber 6B do not increase over the specified pressure $P_P$, and become equal to each other. Therefore, the reverse flow of the puncture sealant from the reservoir bottle 18 toward the surge chamber 6B is not occurred. Accordingly, the first flow passage 35 of the bottle unit 3 is not provided with a one-way valve preventing the reverse flow of the puncture sealant.

While description has been made of particularly preferable embodiments of the present invention, the present invention can be carried out by modifying into various embodiments without being limited to the illustrated embodiments.

Embodiments (1) In order to confirm the effects of the present invention, compressor systems having the structure shown in FIG. 4 and not provided with a relief valve were experimentally manufactured according to the specifications shown in Table 1.

Then, each compressor system was connected to a tire, and the maximum pressure P when the compressor system in its operating condition was left unattended, was measured with the pressure indicator 17 attached to the cylinder subpart 7B.

For comparison, with respect to a conventional compressor system (Conventional example) having a relief valve of which relief valve set pressure was set at 451.3 kPa (if converted to a gauge pressure, 350 kPa), the same test was carried out and the maximum pressure P of the compressor system was measured.

The compressor systems had substantially same specifications except for those shown in the table, and a leaf spring made from metal (stainless) having a nearly gourd shape (the width of the constricted part, 7 mm) was used as the valving element 12B of the air intake valve 12.

The operating force of the air release valve 13 (converted into the pressure on the valving element) was 30 kPa.

Exhaust efficiency: A ratio $T_O/T \times 100(\%)$ was compared as the exhaust efficiency, wherein $T_O$ is the time required for Conventional example to increase the tire air pressure up to 250 kPa (gauge pressure), and T is the time required for embodiment, and the power voltage was 12 volts.

The larger the value, the better the exhaust efficiency.

TABLE 1

| | conventional example | Embodiment 1 | Embodiment 2 | Embodiment 3 | Comparative example 1 | Comparative example 2 | Embodiment 4 | Embodiment 5 | Embodiment 6 | Embodiment 7 | Comparative example 3 | Embodiment 8 | Embodiment 9 | Embodiment 10 | Embodiment 11 |
|---|---|---|---|---|---|---|---|---|---|---|---|---|---|---|---|
| presence or absence of relief valve cylinders | presence | | | | | | absence | | | | | | | | |
| stroke volume V1 ($10^{-3}$ ml) | | | | | | | 5 | | | | | | | | |
| compression volume V2 ($10^{-3}$ ml) | 0.1 | 1.15 | 1.3 | 1.37 | 1.01 | | | | | | 1.3 | | | | |
| specified pressure $P_P$ (kPa) | | | | | | | | 451.3 | | | | | | | |
| ratio V2/{V1 × $P_0$/($P_P$ − $P_0$)} | 0.069 | 0.8 | 0.9 | 0.95 | 0.7 | | | | | | 0.9 | | | | |
| diameter D of air intake hole (mm) | 8 | | 10 | | 2 | 3 | 5 | 10 | 15 | 16 | | 10 | | | |
| thickness t of valving element (mm) | 0.1 | | | | 0.1 | | | | | | | 0.04 | 0.05 | 0.2 | 0.25 |
| maximum pressure (kPa) | 450 | 445 | 450 | 453 | 440 | 440 | 446 | 449 | 450 | 448 | 445 | 452 | 450 | 448 | 446 |
| Exhaust efficiency (%) | 100 | 98 | 99 | 100 | 88 | 90 | 93 | 96 | 99 | 97 | 88 | 93 | 96 | 95 | 87 |

As shown in the table, it was confirmed that the compressor systems as Embodiments could control the pressure of the compressed air supplied to the tire (object to be filled with air) at the substantially specified pressure without using a relief valve, while maintaining high exhaust efficiency.

(2) The compressor system as Conventional example in Table 1, to which a bottle unit having the structure shown in FIG. 7 (the first flow passage was not provided with a one-way valve) was connected, and in such a condition that the tire valve part was clogged, the puncture repair kit was brought into operation and left unattended.

As a result, it was observed that the puncture sealant spouted from the relief valve together with the compressed air when the relief valve was operated in the state left unattended.

In addition, the compressor system as Embodiment 1 in Table 1, to which the bottle unit having the structure shown in FIG. 7 (the first flow passage was not provided with a one-way valve) was connected, and in such a condition that the tire valve part was clogged, the puncture repair kit was brought into operation and left unattended.

As a result, the occurrence of leakage of the puncture sealant in the state left unattended was not observed.

DESCRIPTION OF THE REFERENCE SIGNS 1 puncture repair kit
2 compressor system
3 bottle unit
5 piston
6A pump chamber
6B surge chamber
7 cylinder
7A cylinder main body
7B cylinder subpart
8 air supplying passage
11 crank mechanism
12A air intake hole
12B valving element
12 air intake valve
13 air release valve
18 reservoir bottle
18A mouth portion
19 cap
35 first flow passage
36 second flow passage
41 intake port portion
42 output port portion
M motor
PL lower dead point
PU top dead point

The invention claimed is:

1. A compressor system comprising:
a motor,
a piston driven by the motor through a crank mechanism,
a cylinder having a cylinder main body forming a pump chamber housing the piston reciprocably from a lower dead point to a top dead point and compressing air between the piston and itself,
a cylinder subpart forming a surge chamber for receiving the compressed air compressed in the pump chamber through an air release valve,
an air intake valve having an air intake hole penetrating through the piston to take outside air into the pump chamber,
a valving element formed from a leaf spring closing a pump chamber side of the air intake hole with its elasticity, and
an air supplying passage for sending and supplying the compressed air from the surge chamber toward outside,
wherein the diameter D of the air intake hole is 3 to 15 mm,
wherein a maximum supply pressure $P_P$ is specified for the compressed air to be supplied and an atmospheric pressure is specified as $P_0$
wherein a pressure ratio P is defined as $P_0/(P_P-P_0)$,
wherein a stroke volume V1 is a cylinder volume between the lower dead point to the top dead point,
wherein a compression volume V2 is a cylinder volume when the piston is at the top dead point, and
wherein V2 is in a range defined by the following equation:

$$0.8 \times \{V1 \times P\} \leq V2 < 1.0 \times \{V1 \times P\}$$

whereby, without using any relief valve, the compressor system is able to supply the compressed air whose supply pressure is controlled not to increase beyond the specified maximum supply pressure $P_P$.

2. The compressor system as set forth in claim 1, wherein the valving element has a thickness t of from 0.05 to 0.2 mm.

3. The compressor system as set forth in claim 1 wherein the valving element has a nearly gourd shape made up of a fixed part fixed to an upper surface of the piston, a covering part being disk-shaped and covering the air intake hole, and a constricted part disposed therebetween, and
wherein the width W of the constricted part is not more than 10 mm.

4. A puncture repair kit, which has the compressor system as set forth in claim 1, and a bottle unit in which a cap is attached to a mouth portion of a reservoir bottle containing a puncture sealant,
wherein the cap has an air intake port portion for feeding the compressed air from the compressor system into the reservoir bottle through a first flow passage, and
wherein an output port portion for sequentially taking out the puncture sealant and the compressed air from the reservoir bottle through a second flow passage upon feeding of the compressed air, and
wherein the first flow passage is not provided with a one-way valve for preventing the puncture sealant from flowing reversely toward the compressor system.

5. The puncture repair kit as set forth in claim 4, wherein the air intake port portion of the cap is directly connected to the compressor system.

6. The compressor system as set forth in claim 2, wherein the valving element has a nearly gourd shape made up of a fixed part fixed to an upper surface of the piston, a covering part being disk-shaped and covering the air intake hole, and a constricted part disposed therebetween, and
wherein the width W of the constricted part is not more than 10 mm.

7. A puncture repair kit, which has the compressor system as set forth in claim 2, and a bottle unit in which a cap is attached to a mouth portion of a reservoir bottle containing a puncture sealant,
wherein the cap has an air intake port portion for feeding the compressed air from the compressor system into the reservoir bottle through a first flow passage,
wherein an output port portion for sequentially taking out the puncture sealant and the compressed air from the reservoir bottle through a second flow passage upon feeding of the compressed air, and
wherein the first flow passage is not provided with a one-way valve for preventing the puncture sealant from flowing reversely toward the compressor system.

8. A puncture repair kit, which has the compressor system as set forth in claim 3, and a bottle unit in which a cap is attached to a mouth portion of a reservoir bottle containing a puncture sealant,
wherein the cap has an air intake port portion for feeding the compressed air from the compressor system into the reservoir bottle through a first flow passage, and
wherein an output port portion for sequentially taking out the puncture sealant and the compressed air from the reservoir bottle through a second flow passage upon feeding of the compressed air, and wherein the first flow passage is not provided with a one-way valve for preventing the puncture sealant from flowing reversely toward the compressor system.

* * * * *